(12) United States Patent
Berry et al.

(10) Patent No.: US 12,515,207 B2
(45) Date of Patent: Jan. 6, 2026

(54) METAL-METAL BONDED AMMONIA OXIDATION CATALYSTS

(71) Applicant: WISCONSIN ALUMNI RESEARCH FOUNDATION, Madison, WI (US)

(72) Inventors: John Berry, Madison, WI (US);
Christian Wallen, Madison, WI (US);
Michael Trenerry, Madison, WI (US);
Tristan Brown, Houston, TX (US);
Sungho Park, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 52 days.

(21) Appl. No.: 17/939,405

(22) Filed: Sep. 7, 2022

(65) Prior Publication Data

US 2023/0014161 A1 Jan. 19, 2023

Related U.S. Application Data

(62) Division of application No. 17/078,868, filed on Oct. 23, 2020, now Pat. No. 11,465,136.

(60) Provisional application No. 62/924,761, filed on Oct. 23, 2019.

(51) Int. Cl.
*B01J 31/18* (2006.01)
*C01B 21/02* (2006.01)
*C25B 1/01* (2021.01)
*C25B 11/085* (2021.01)

(52) U.S. Cl.
CPC .......... *B01J 31/1815* (2013.01); *C01B 21/02* (2013.01); *C25B 1/01* (2021.01); *C25B 11/085* (2021.01); *B01J 2231/70* (2013.01); *B01J 2531/821* (2013.01)

(58) Field of Classification Search
None
See application file for complete search history.

(56) References Cited

PUBLICATIONS

Smith III et al., Proceedings of the National Academy of Sciences, 116, 2849-2853 (Year: 2019).*
Meyer et al. Inorganic Chemistry, 42, 1707-1710 (Year: 2003).*

* cited by examiner

*Primary Examiner* — Yun Qian
(74) *Attorney, Agent, or Firm* — Quarles & Brady LLP

(57) ABSTRACT

Methods and catalysts for oxidizing ammonia to nitrogen are described. Specifically, diruthenium complexes that spontaneously catalyze this reaction are disclosed. Accordingly, the disclosed methods and catalysts can be used in various electrochemical cell-based energy storage and energy production applications that could form the basis for a potential nitrogen economy.

18 Claims, 9 Drawing Sheets
(6 of 9 Drawing Sheet(s) Filed in Color)

METAL-METAL BONDED AMMONIA OXIDATION CATALYSTS

CROSS-REFERENCE TO RELATED APPLICATIONS

This application is a divisional of U.S. application Ser. No. 17/078,868, filed Oct. 23, 2020, which application claims priority to U.S. Provisional Patent Application No. 62/924,761, filed Oct. 23, 2019. All applications are hereby incorporated by reference herein in their entireties.

STATEMENT REGARDING FEDERALLY SPONSORED RESEARCH OR DEVELOPMENT

This invention was made with government support under DE-SC0016442 awarded by the US Department of Energy. The government has certain rights in the invention.

FIELD OF THE INVENTION

This disclosure is directed to diruthenium complexes and the use of such complexes to catalyze the oxidation of ammonia.

BACKGROUND OF THE INVENTION

Ammonia ($NH_3$) is a colorless, pungent gas. In its liquid form, ammonia is an excellent source of hydrogen (containing twice as much hydrogen by volume as liquid hydrogen). In addition, there are existing supply chains and regulations, which allow for widespread distribution. As a result, ammonia is of interest as a fuel in fuel cells and other applications, where ammonia may be oxidized to nitrogen using an oxidant such as oxygen. However, the chemical interconversion between nitrogen and ammonia has remained a great challenge for chemists.

A functional "nitrogen economy" with widespread use of ammonia as a fuel requires the development of two primary technologies: (1) the efficient synthesis of ammonia from air, light, and water; and (2) the reverse reaction—the efficient oxidation of ammonia to power fuel cells.

Major efforts in the field of inorganic chemistry have sought to address each of these challenges. It is well established that ammonia binds tightly to transition metals, making it difficult to activate. Numerous efforts to activate ammonia using transition metal complexes have resulted in steady progress, particularly electrocatalytic approaches, which use an applied potential to improve reaction kinetics. However, the overpotential needed to drive such reactions (i.e., the amount of additional energy required beyond what is thermodynamically expected) is too high to be practical using prior catalysts. Thus, reducing the overpotential or identifying catalysts that do not require added potential is the key to enabling direct ammonia fuel cell technology.

Accordingly, there is need for the development of catalysts and methods for oxidizing ammonia to nitrogen without applying a substantial overpotential. Such catalysts and methods could be used as the basis for a nitrogen economy using ammonia fuel cells to store and supply energy.

BRIEF SUMMARY

We disclose herein diruthenium complexes that spontaneously react with ammonia to form nitrogen. These complexes also catalyze the oxidation of ammonia to nitrogen with a low overpotential. Accordingly, such compounds are a significant improvement as compared to previously known catalysts for the oxidation of ammonia and could form the basis of a cost-effective and scalable ammonia fuel cell that could support a potential nitrogen economy.

In a first aspect, the disclosure encompasses a diruthenium complex having the chemical structure:

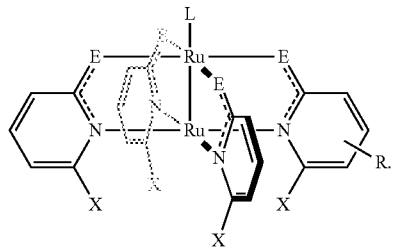

The central diruthenium is $[Ru]_2^{n+}$, where n is 3-7; L, which may or may not be present, is, if present, a non-competitively binding ligand; each E, which may be the same or different, is independently O, S, NH or NY, where Y is an alkyl or an aryl group; each X, which may be the same or different, is a steric tuning group; and R, which may or may not be present, is (if present) an electronic tuning group.

The diruthenium complex is subject to the following provisos. If L is $BF_4$ and each E is O, then all four X are not Cl; if L is Cl and each E is O, then all four X are not Cl or F; and if L is OMe, THF, or pyridine, and each E is O, then all four X are not Cl.

In some embodiments, L is trifluoromethanesulfonate (OTf), $NH_3$, $BF_4$, Cl, $OCH_3$ (OMe), tetrahydrofuran (THF) or pyridine.

In some embodiments, each E is NH or NY, where Y is methyl (Me) or phenyl (Ph).

In some embodiments, each E is O.

In some embodiments, each X is a halogen, a methyl (Me), or a —$(CH)_4$—, where the —$(CH)_4$— is attached at one end to the carbon atom attached to X, and attached at the other end to the carbon atom directly adjacent to the carbon atom attached to X, forming a fused bicyclic aromatic (quinoline) core.

In some embodiments, each X is Cl, F, or Me.

In some embodiments, R is not present.

In other embodiments, R is present. In some such embodiments, R is trimethylsilyl (TMS) or bromine.

In some embodiments, L is OTf; each E is O; each X is Cl, F, or Me; and R is not present. In some such embodiments, each X is Cl. In other such embodiments, each X is F. In yet other such embodiments, each X is Me.

In some embodiments, L is $NH_3$; each E is O; each X is Cl, F, or Me; and R is not present. In some such embodiments, each X is Cl. In other such embodiments, each X is F. In yet other such embodiments, each X is Me.

In a second aspect, the disclosure encompasses a method of oxidizing $NH_3$ to $N_2$. The method includes the step of contacting a catalyst comprising a diruthenium complex with $NH_3$, which results in the oxidation of $NH_3$ to $N_2$.

In some embodiments, the $NH_3$ is spontaneously oxidized to $N_2$ without applying an externally generated electrical potential.

In some embodiments, the diruthenium complex has the chemical structure:

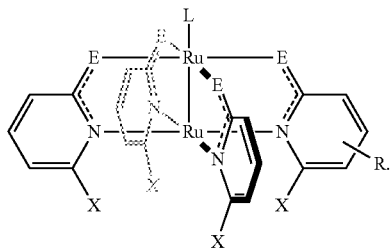

The central diruthenium is $[Ru]_2^{n+}$, where n is 3-7; L is a non-competitive ligand; each E, which may be the same or different, is independently O, S, NH or NY, where Y is an alkyl or an aryl; each X, which may be the same or different, is a steric tuning group; and R, which may or may not be present, is (if present) an electronic tuning group.

In some embodiments, L is $BF_4$, Cl, $OCH_3$ (OMe), tetrahydrofuran (THF), pyridine, trifluoromethanesulfonate (OTf) or $NH_3$.

In some embodiments, each E is NH or NY, where Y is methyl (Me) or phenyl (Ph).

In some embodiments, each E is O.

In some embodiments, each X is a halogen, a methyl (Me) or a —$(CH)_4$—, where the —$(CH)_4$— is attached at one end to the carbon atom attached to X, and attached at the other end to the carbon atom directly adjacent to the carbon atom attached to X, forming a fused bicyclic aromatic core.

In some embodiments, R is not present.

In other embodiments, R is present. In some such embodiments, R is trimethylsilyl (TMS) or bromine.

In some embodiments, L is OTf; each E is O; each X is Cl, F, or Me; and R is not present. In some such embodiments, each X is Cl. In other such embodiments, each X is F. In yet other such embodiments, each X is Me.

In some embodiments, L is $NH_3$; each E is O; each X is Cl, F, or Me; and R is not present. In some such embodiments, each X is Cl. In other such embodiments, each X is F. In yet other such embodiments, each X is Me.

In some embodiments, L is $BF_4$; each E is O; each X is Cl; and R is not present.

In some embodiments, L is Cl; each E is O; each X is Cl; and R is not present.

In some embodiments, L is Cl; each E is O; each X is F; and R is not present.

In some embodiments, L is OMe; each E is O; each X is Cl; and R is not present.

In some embodiments, L is THF; each E is O; each X is Cl; and R is not present.

In some embodiments, L is pyridine; each E is O; each X is Cl; and R is not present.

In some embodiments, the catalyst and the $NH_3$ are in contact with an anode electrode at which the oxidation of $NH_3$ to $N_2$ occurs. In some such embodiments, the catalyst is in a solution of an organic solvent that is in contact with the anode electrode.

In some embodiments, the oxidation of $NH_3$ to $N_2$ occurs with low or no overpotential.

In some embodiments, the anode electrode is part of an electrochemical cell that further includes a cathode electrode at which a reduction reaction occurs. The cathode electrode is in fluid, ionic, and/or electrical communication with the anode electrode. In some such embodiments, the electrochemical cell is an energy storage cell, a fuel cell, or an electrosynthetic cell. In some such embodiments, the electrochemical cell is a direct ammonia fuel cell.

In some embodiments, the electrochemical cell includes a membrane or barrier separating the anode electrode from the cathode electrode.

In some embodiments, the cathode electrode includes or is in contact with an oxygen reduction catalyst.

In some embodiments, $O_2$ is simultaneously reduced to $H_2O$ at the cathode electrode.

In a third aspect, the disclosure encompasses an electrochemical half-cell that includes an anode electrode in contact with a catalyst that includes a diruthenium complex. The catalyst is capable of spontaneously catalyzing the oxidation of $NH_3$ to $N_2$.

In some embodiments, the catalyst is in a solution of an organic solvent that is in contact with the anode electrode.

In some embodiments, the anode electrode is further in contact with $NH_3$. In some such embodiments, the oxidation of $NH_3$ to $N_2$ is occurring at the anode electrode.

In some embodiments, the diruthenium complex has the chemical structure:

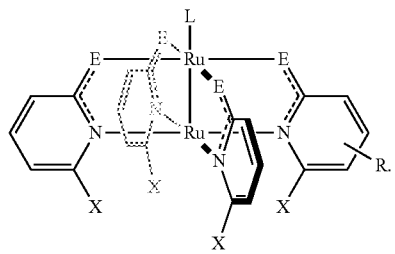

The central diruthenium is $[Ru]_2^{n+}$, where n is 3-7; L is a non-competitive ligand; each E, which may be the same or different, is independently O, S, NH or NY, where Y is an alkyl or an aryl; each X, which may be the same or different, is a steric tuning group; and R, which may or may not be present, is (if present) an electronic tuning group.

In some embodiments, L is $BF_4$, Cl, $OCH_3$ (OMe), tetrahydrofuran (THF), pyridine, trifluoromethanesulfonate (OTf) or $NH_3$.

In some embodiments, each E is NH or NY, where Y is methyl (Me) or phenyl (Ph).

In some embodiments, each E is O.

In some embodiments, each X is Cl, F, a methyl (Me) or a —$(CH)_4$—, where the —$(CH)_4$— is attached at one end to the carbon atom attached to X, and attached at the other end to the carbon atom directly adjacent to the carbon atom attached to X, forming a fused bicyclic aromatic core.

In some embodiments, R is not present.

In some embodiments, R is present. In some such embodiments, R is trimethylsilyl (TMS) or bromine.

In some embodiments, L is OTf; each E is O; each X is Cl, F, or Me; and R is not present. In some such embodiments, each X is Cl. In other such embodiments, each X is F. In yet other such embodiments, each X is Me.

In some embodiments, L is $NH_3$; each E is O; each X is Cl, F, or Me; and R is not present. In some such embodiments, each X is Cl. In other such embodiments, each X is F. In yet other such embodiments, each X is Me.

In some embodiments, L is $BF_4$; each E is O; each X is Cl; and R is not present.

In some embodiments, L is Cl; each E is O; each X is Cl; and R is not present.

In some embodiments, L is Cl; each E is O; each X is F; and R is not present.

In some embodiments, L is OMe; each E is O; each X is Cl; and R is not present.

In some embodiments, L is THF; each E is O; each X is Cl; and R is not present.

In some embodiments, L is pyridine; each E is O; each X is Cl; and R is not present.

In some embodiments, the electrochemical half-cell is part of an electrochemical cell, where the electrochemical half-cell is in fluid, ionic and/or electrical communication with an electrochemical half-cell that includes a cathode electrode. In some such embodiments, the electrochemical cell is an energy storage cell, a fuel cell, or an electrosynthetic cell.

In some embodiments, the electrochemical cell includes a membrane or barrier separating the anode electrode and the cathode electrode.

In some embodiments, the cathode electrode includes a catalyst capable of catalyzing the reduction of $O_2$ to $H_2O$.

In some embodiments, when the electrochemical cell is in operation, $O_2$ is being reduced to $H_2O$ at the cathode electrode. In some embodiments, when the electrochemical cell is in operation, $NH_3$ is being oxidized to $N_2$ at the anode electrode.

In some embodiments, the electrochemical cell is a direct ammonia fuel cell.

Further objects, features and advantages of the invention will be apparent from the following detailed description when taken in conjunction with the accompanying drawings.

BRIEF DESCRIPTION OF THE DRAWINGS

The disclosure will be better understood and features, aspects and advantages other than those set forth above will become apparent when consideration is given to the following detailed description. Such detailed description makes reference to the following drawings. The patent or application file contains at least one drawing executed in color. Copies of this patent or patent application publication with color drawing(s) will be provided by the Office upon request and payment of the necessary fee.

Figure 1A:
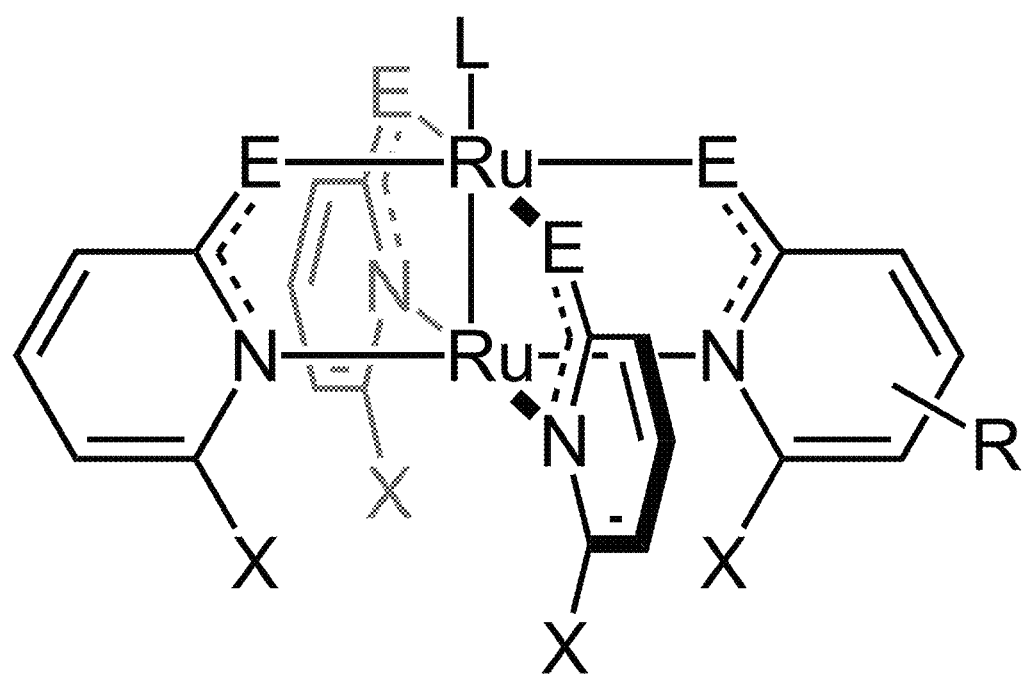
FIG. 1A shows the generic chemical structure of the diruthenium complexes that can act as a catalyst for the spontaneous oxidation of ammonia. The metal complexes include a central $[Ru]_2^{n+}$ (n is 3-7), four equatorial ligands that together with the central $[Ru]_2^{n+}$ core form a "paddle-wheel" structure, and an axial non-competitive ligand (L).

While the invention is susceptible to various modifications and alternative forms, specific embodiments have been shown by way of example in the drawings and are herein described in detail. The description of specific embodiments is not intended to limit the invention to the particular forms disclosed, but on the contrary, is intended to cover all modifications, equivalents, and alternatives falling within the spirit and scope of the invention as defined by the appended claims.

DETAILED DESCRIPTION

I. In General

This invention is not limited to the particular methodology, protocols, materials, and reagents described, as these may vary. It is also to be understood that the terminology used in this disclosure is for the purpose of describing particular embodiments only and is not intended to limit the scope of the present invention, which will be limited only by the language of the appended claims.

As used in this disclosure and in the appended claims, the singular forms "a", "an", and "the" include plural reference unless the context clearly dictates otherwise. The terms "a" (or "an"), "one or more" and "at least one" can be used interchangeably. The terms "comprising", "including", and "having" can also be used interchangeably.

Unless defined otherwise, all technical and scientific terms used in this disclosure, including element symbols, have the same meanings as commonly understood by one of ordinary skill in the art. Chemical compound names that are commonly used and recognized in the art are used interchangeably with the equivalent IUPAC names.

All publications and patents specifically mentioned in this disclosure are incorporated by reference for all purposes.

II. The Invention

This disclosure is based on our discovery that diruthenium complexes with the oxidation state $[Ru_2]^{5+}$ can spontaneously oxidize ammonia to nitrogen. Notably, the disclosed diruthenium complexes catalyze the ammonia oxidation half-reaction upon reoxidation from $[Ru_2]^{4+}$ to $[Ru_2]^{5+}$ with the overpotential set by the $[Ru_2]^{4+/5+}$ redox potential. Accordingly, the diruthenium complexes could be used in improved fuel cells for energy storage applications, such as in direct ammonia fuel cells.

Structure of the Diruthenium Complex Catalysts

The diruthenium complex catalysts have the general chemical structure shown in FIG. 1A.

As seen in FIG. 1A, the general structure includes a diruthenium core at the center (Ru—Ru). The oxidation state of the diruthenium core may vary. Specifically, the diruthenium may have a charge of +3 to +7 (i.e., the diruthenium can be designated as $[Ru]_2^{n+}$, where n=3-7).

As further seen in FIG. 1A, four equatorial ligands are arranged around the diruthenium at 90° intervals, forming a square planar "paddlewheel" structure. The equatorial ligands are kinetically inert. The four equatorial ligands may be structurally the same, or they may be structurally different.

For each equatorial ligand, E is O, NH, N(aryl), N(alkyl) or S. A non-limiting example of N(aryl) is N(phenyl), where the phenyl may be substituted or unsubstituted. A non-limiting example of N(alkyl) is N(methyl).

For each equatorial ligand, X is a steric tuning group. Non-limiting examples include halogens such as Br or Cl, alkyl groups such as methyl, or an aromatic ring that is installed in such a way as to form a fused bicyclic aromatic core that may be substituted or unsubstituted. A specific example of such X group is —(CH)$_4$—, where the —(CH)$_4$— is attached at one end to the carbon atom attached to X, and attached at the other end to the carbon atom directly adjacent to the carbon atom attached to X (i.e., a substituted quinoline).

Each equatorial ligand may also include R, an electronic tuning group. The presence of R is optional and not required. Non-limiting examples for R include halogens such as Br, trimethylsilyl (TMS), or a fused aromatic ring as described in the previous paragraph.

Figure 1B:
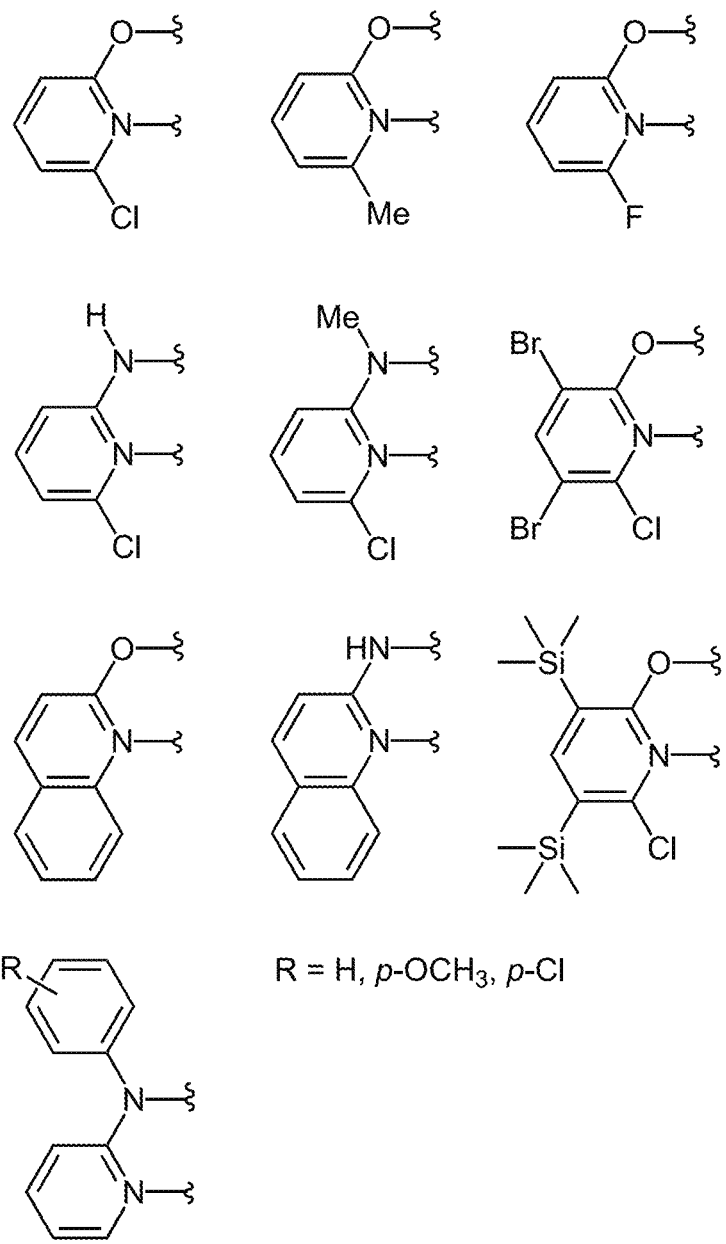
FIG. 1B shows the chemical structure of ten exemplary equatorial ligands that could be used to form the diruthenium complexes. These exemplary equatorial ligands are non-limiting, in that other structurally similar equatorial ligands could also be used to form other diruthenium complexes.

Ten non-limiting examples of possible equatorial ligands are shown in FIG. 1B.

As seen in FIG. 1A, the general complex structure further may or may not include a non-competitive ligand, L, arranged in an axial position relative to the four equatorial ligands. Accordingly, the five ligands form a square pyramidal geometry around one Ru atom of the central $[Ru]_2^{n+}$ core, with the axial ligand L at the peak of the pyramid and the four equatorial ligands at the corners of the square. Non-limiting examples for L include $NH_3$, trifluoromethanesulfonate (OTf), $BF_4$, Cl, $OCH_3$ (OMe), tetrahydrofuran (THF), or pyridine.

The following examples are offered for illustrative purposes only and are not intended to limit the scope of the invention in any way. Indeed, various modifications of the invention in addition to those shown and described herein will become apparent to those skilled in the art from the foregoing description and the following examples, falling within the scope of the appended claims.

III. EXAMPLES

Example 1: Synthesis and Use of an Exemplary Diruthenium Complex to Spontaneously Catalyze the Oxidation of $NH_3$ to $N_2$ This example provides a "proof of principle" by demonstrating the use of an exemplary diruthenium catalyst to oxidize ammonia to nitrogen spontaneously and with no overpotential.

The chemical interconversion between nitrogen and ammonia is one of the most difficult mechanistic challenges for chemists, but it is one that holds the potential to radically transform the world's energy economy. A functional Nitrogen Economy (FIG. 2A) requires the development of two key technologies: (1) ammonia synthesis from air, light, and water, and its reverse; (2) ammonia oxidation to power fuel cells.

Major efforts in the field of inorganic chemistry have sought to address each of these challenges. Ammonia has been known to bind to transition metal salts since the early 1800s. The resulting ammine complexes are generally very stable and the ammonia ligand is difficult to activate, as in the classic Werner-type complexes $[Ru(NH_3)_6]^{n+}$ (n=2, 3). Highlights of recent efforts to activate ammonia using transition metal complexes include: the coordination of $NH_3$ to low-valent metal centers reported by Chirik and coworkers to spontaneously eliminate $H_2$, and elimination of $N_2$ from Ru—$NH_3$ complexes upon oxidation. In the latter case, Hamann, Smith, and coworkers developed an electrocatalytic system to split ammonia into $N_2$ and $H_2$ at an applied potential of 0.20 V vs $Fc^{0/+}$, an overpotential (η) of 1.47 V vs the thermodynamic standard reduction potential ($N_2$+ 6e$^-$+6$H_2O$→2 $NH_3$+6 OH–; E°=–1.27 V vs $Fc^{0/+}$ ). (Habibzadeh, F.; Miller, S. L.; Hamann, T. W.; Smith, M. R. Homogeneous electrocatalytic oxidation of ammonia to $N_2$ under mild conditions. *Proceedings of the National Academy of Sciences* 2019, 116, 2849-2853.)

Reducing the η is the key to making direct ammonia fuel cell technology possible. In this example, we report a metal-metal bonded diruthenium complex 2 that spontaneously forms nitrogen from ammonia without any applied potential. Moreover, we have found that the diruthenium paddlewheel complex 2 can be oxidized and reduced in batch cycles using oxygen as the sacrificial oxidant, demonstrating the feasibility of 2 as a catalyst for the chemical reactions necessary for a direct ammonia fuel cell.

Figures 2A, 2B:
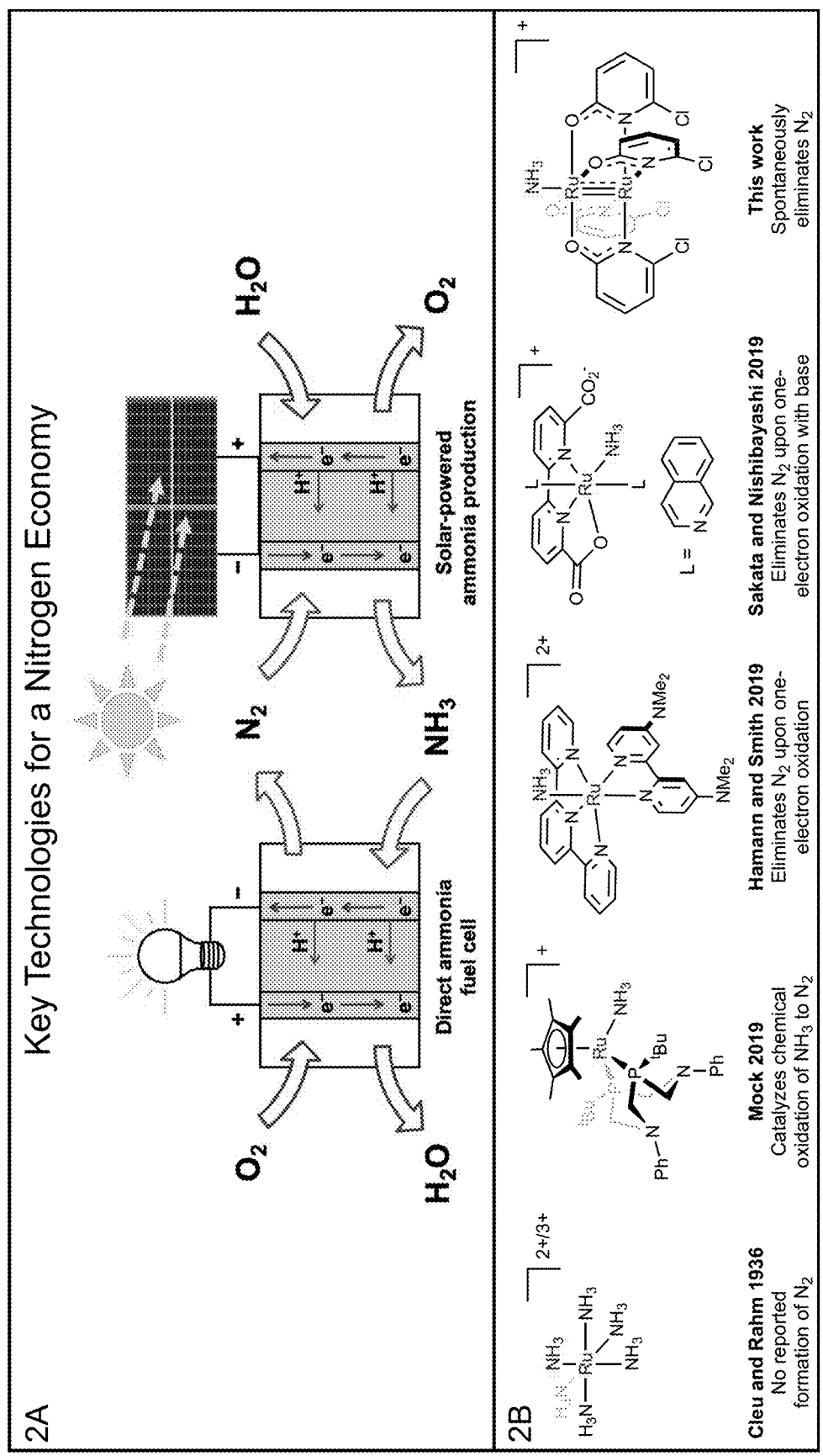
FIG. 2A is a schematic drawing that illustrates the essential components of a nitrogen economy.
FIG. 2B compares the chemical structure of previously published transition metal complexes with ammonia with an exemplary diruthenium ammonia complex of the present disclosure.

We have focused on the ability of d-orbital interactions in metal-metal bonded compounds to facilitate multi-electron reactions. Recently, we have explored the chemistry of $Ru_2$ compounds supported by 6-chloro-2-hydroxypyridinate (chp$^-$) equatorial ligands, as shown in FIG. 2B (rightmost structure). These ligands support a variety of compounds having the $[Ru_2]^{5+}$ oxidation state that are air stable and deep purple in color. These compounds may also be chemically reduced the $[Ru_2]^{4+}$ state giving compounds that are generally air sensitive and brown in color. In both the $[Ru_2]^{4+}$ and $[Ru_2]^{5+}$ oxidation states, the compounds are paramagnetic with S=1 and S=3/2, respectively.

The new $[Ru_2]^{5+}$ complex ($Ru_2(chp)_4OTf$), 2, was prepared by metathesis of $Ru_2(chp)_4Cl$ with TlOTf. Addition of $NH_3$ to 2 at –25° C. yields 3 ($[Ru_2(chp)_4NH_3]OTf$), which has been crystallographically characterized (See FIG. 3). The crystal structure displays intermolecular hydrogen bonding interactions that can be tamed when 3 is exposed to 18-crown-6 (18-c-6) at –25° C. to yield 4 ($[Ru_2(chp)_4(NH_3)$(18-c-6)]OTf). The structure of 4 shown in FIG. 3 reveals that all three hydrogens in the ammine ligand are hydrogen-bonding to oxygen atoms in the 18-c-6. At room temperature, solutions of 3 are unstable and slowly produce an amber-colored species.

Upon addition of 18-c-6 to the mixture of 3 and its decomposition products, complex 7 ($[Ru_2(chp)_4(NH_3)]_2$(18-c-6)) can be crystallized. This sandwich complex is structurally similar to 4, but instead displays a total of six hydrogen bonds between the 18-c-6 and each ammine ligand in two diruthenium complexes. Complex 6 may also be synthesized independently from dimeric 5 ([Ru$_2$(chp)$_4$]$_2$), a dimeric complex formed by zinc reduction of 1 (Brown, T. R.; Dolinar, B. S.; Hillard, E. A.; Clérac, R.; Berry, J. F. Electronic Structure of Ru$_2$(II,II) Oxypyridinates: Synthetic, Structural, and Theoretical Insights into Axial Ligand Binding. *Inorg. Chem.* 2015, 54, 8571-8589) and subsequent reaction with an aqueous or non-aqueous solution of ammonia. Addition of 18-c-6 to 6 also leads to crystallization of 7.

Through deliberate synthesis of 6 and 7 we were able to confirm that the reaction of the [Ru$_2$]$^{5+}$ complex with ammonia results in a one-electron reduction to a [Ru$_2$]$^{4+}$ complex. Thus, ammonia must be oxidized, and we therefore pursued characterization of the other products in this reaction.

Figure 3:
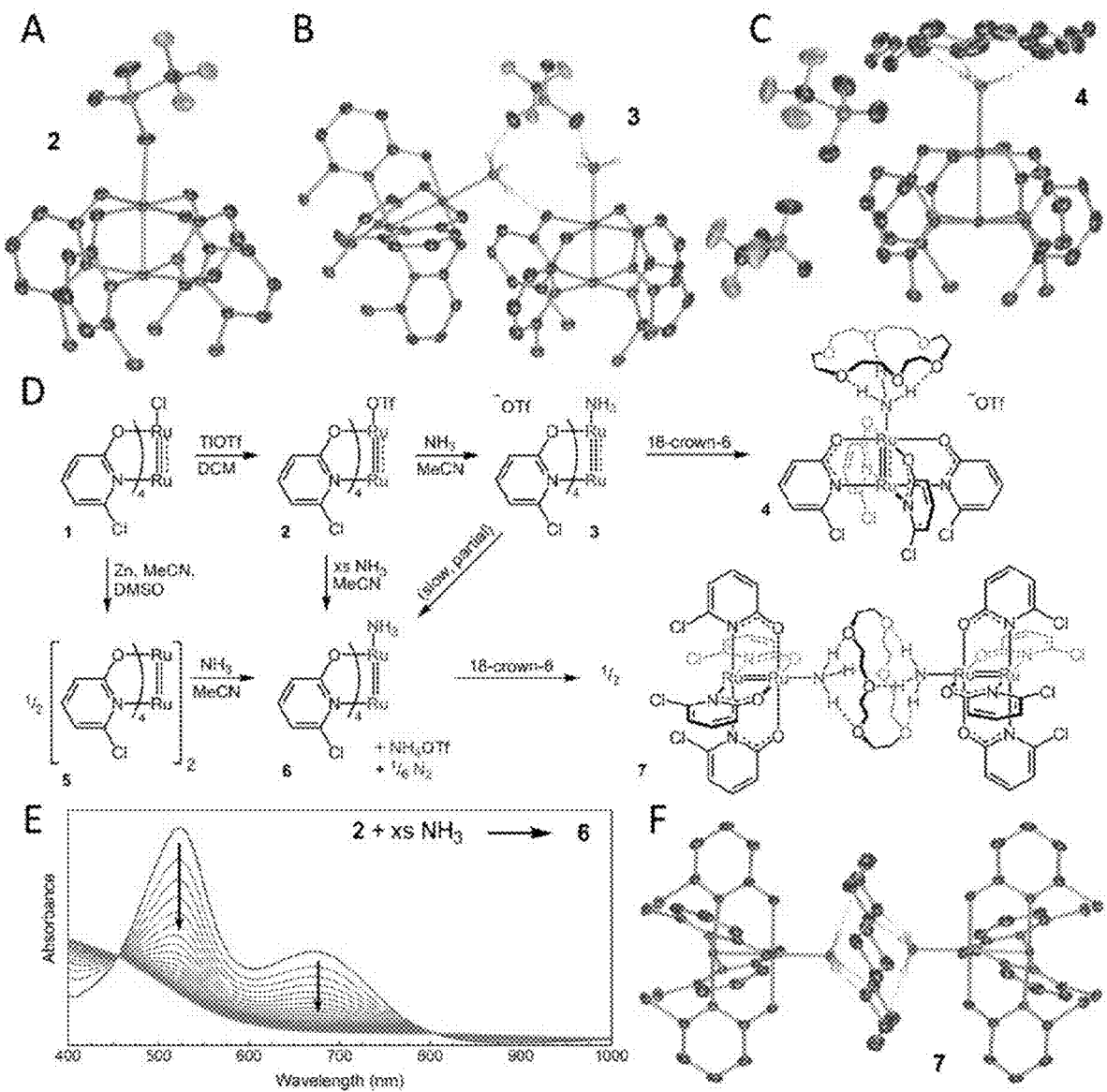
FIG. 3 illustrates the synthetic scheme, crystal structures, and electronic absorption data associated with the reaction of diruthenium complex 2 with ammonia.

Stirring 2 with excess ammonia results in complete conversion to 6, as monitored via electronic absorption spectroscopy (see FIG. 3, lower left). Additionally, NMR spectroscopic characterization of the material recovered from this reaction shows a distinct triplet assigned to NH$_4^+$.

To test for the formation of N$_2$, we subjected 2 to excess $^{15}$NH$_3$ in an argon atmosphere and found $^{15}$N$^{15}$N in the headspace. A 40% yield of $^{15}$N$^{15}$N was determined by mass spectrometry analysis of the reaction headspace, on the basis of a presumed 6:1 molar ratio between 2 and N$_2$ (Equation 1). This value should be considered to be a lower bound for the true yield of N$_2$, which is difficult to analyze quantitatively. Remarkably, we have obtained a yield of 12% when using aqueous $^{15}$NH$_3$, demonstrating that water hinders the ammonia oxidation reaction but does not shut down the reaction entirely.

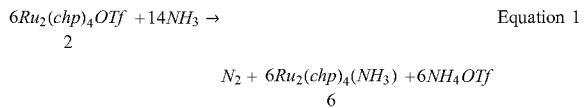

Equation 1

Since 2 contains a [Ru$_2$]$^{5+}$ core, a one-electron oxidized form of the [Ru$_2$]$^{4+}$ core in 6, we explored the electrochemical features of 2 to see whether an electrochemical cycle for ammonia oxidation could be developed.

The cyclic voltammogram of 2 in CH$_3$CN (See FIG. 4A, red trace) shows a reversible event assigned to the [Ru$_2$]$^{4+/5+}$ redox couple at E$_{1/2}$=−128 mV vs Fc$^{0/+}$, as well as a second reversible event at E$_{1/2}$=−347 mV assigned to the [Ru$_2$]$^{4+/5+}$ redox couple for the solvent complex Ru$_2$(chp)$_4$ (NCCH$_3$), which is in equilibrium with 2. The addition of 0.8 equivalents of ammonia to this solution creates a new reversible feature at E$_{1/2}$=−255 mV while completely eliminating the feature assigned to the [Ru$_2$]$^{4+/5+}$ couple of 2 (See FIG. 4A, purple trace). The new feature is assigned to the [Ru$_2$]$^{4+/5+}$ redox couple for the [Ru$_2$(chp)$_4$(NH$_3$)]$^+$ cation in 3 (i.e., 6$^+$ ), which is confirmed by its appearance in voltammograms collected for 6, the one-electron reduced analogue Ru$_2$(chp)$_4$(NH$_3$) (See FIG. 4A, yellow trace).

Constant current electrolysis of 6 was performed in a divided cell with a reticulated vitreous carbon (RVC) working electrode and a platinum rod counter electrode in a solution of ferrocenium hexafluorophosphate (FcPF$_6$) as the sacrificial oxidant. Electronic absorption spectra were simultaneously collected throughout each experiment.

With no excess added ammonia (minimal ammonia concentration of <5 mM, See FIG. 4B, brown trace), the applied electrode potential required to sustain 0.5 mA current begins at −245 mV, approximately the E$_{1/2}$ of 6, and starts to increase rapidly after 36 minutes (1.08 C charge passed, 0.68 e$^−$ equivalents vs [Ru$_2$]) before plateauing at ~600 mV. The abrupt shift to higher applied potentials marks a transition from [Ru$_2$]$^{4+}$ oxidation to a different predominant electrode process, indicating depletion of 6 and formation of 6$^+$. Electronic absorption data (See FIG. 4C, brown trace) are consistent with this interpretation and show a charge-dependent linear increase in characteristic Ru$_2^{5+}$ absorbances at 530 nm and 675 nm that plateaus after the passage of one charge equivalent (See FIG. 4C, 1 F/mol mark), indicative of stoichiometric bulk oxidation from [Ru$_2$]$^{4+}$ to [Ru$_2$]$^{5+}$ species, respectively amber and purple in color. The introduction of excess $^{15}$NH$_3$ to the solution after bulk oxidation yields the same color change from purple to amber seen in the reaction of 2 with ammonia, indicative of reduction back to a [Ru$_2$]$^{4+}$ state. Additionally, $^{15}$N$^{15}$N was detected in the headspace by mass spectrometry, confirming that N$_2$ is formed from oxidation of ammonia.

Figures 4A, 4B, 4C, 4D, 4E, 4F:
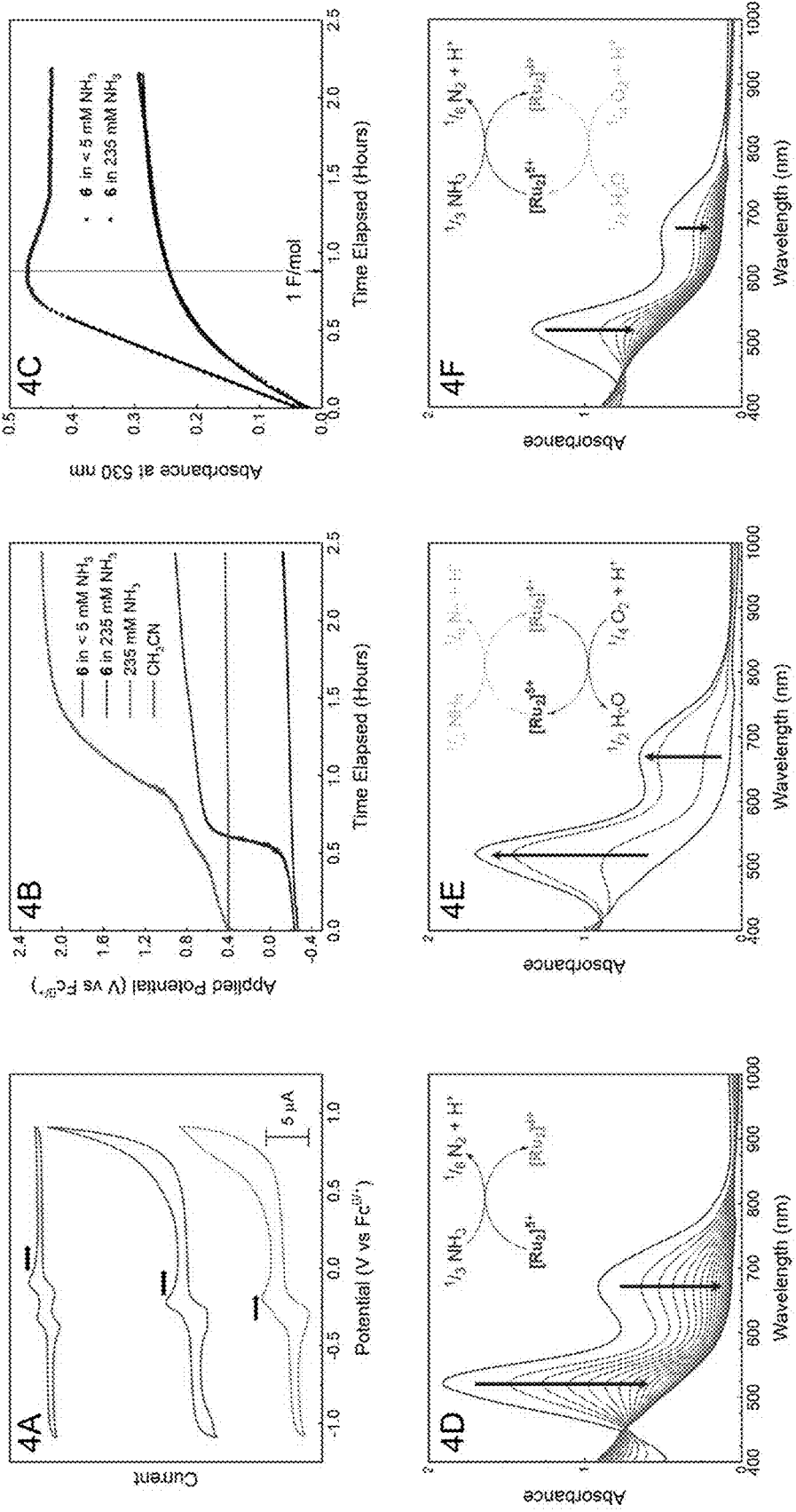
FIGS. 4A, 4B, and 4C show cyclic voltammograms for diruthenium complex 2 in $CH_3CN$ (4A, red trace), diruthenium complex 3 in $CH_3CN$ (4A, purple trace), diruthenium complex 6 in $CH_3CN$ (4A, yellow trace), controlled current traces for the electrochemical oxidation of ammonia with diruthenium complex 6 in $CH_3CN$ (4B), and electronic absorption traces collected during electrochemical oxidation of ammonia with diruthenium complex 6 in $CH_3CN$. Electrochemical experiments were conducted using 100 mM $Bu_4NPF_6$ as the supporting electrolyte and potentials were referenced to $Fc^{0/+}$.
FIGS. 4D, 4E, and 4F show electronic absorption spectra illustrating the reduction of diruthenium complex 3 to diruthenium complex 6 with 100 equivalents of ammonia (4D), the subsequent oxidation of diruthenium complex 6 to diruthenium complex 3 with oxygen (4E), and the reduction of diruthenium complex 3 to diruthenium complex 6 with an additional 100 equivalents of ammonia (4F). Time intervals between scans are 5 minutes.

When a similar experiment is conducted in the presence of excess ammonia (235 mM, 1070 equiv. vs [Ru$_2$], See FIG. 4B, blue trace), 0.5 mA current is sustained for over 2.5 hours at low potentials ranging from −284 to −121 mV, with no increase to potentials capable of direct AOR at the RVC electrode (~400 mV, See FIG. 4B, green trace). Electrolysis at the [Ru$_2$]$^{4+/5+}$ redox couple thus continues to be the predominant electrode process even after the passage of 4.4 C, well beyond the charge required for stoichiometric one-electron oxidation of 6 (1.6 C). This implies that exogenous ammonia continually reduces 6$^+$ formed electrolytically over the course of the experiment, thereby regenerating 6 and delaying the full conversion to [Ru$_2$]$^{5+}$ products. Concomitant electronic absorption data (See FIG. 4C, blue trace) confirm this hypothesis, showing a diminished net rate of [Ru$_2$]$^{5+}$ formation compared to bulk electrolysis performed at an identical current but lower concentration of ammonia. Modeling of these data indicates pseudo-first-order kinetics in [Ru$_2$]$^{5+}$ for the rate-determining ammonia oxidation step (k$_{obs}$=5.63×10$^{-4}$ s$^{-1}$ at 235 mM NH$_3$). The sustained passage of superstoichiometric charge at potentials near the [Ru$_2$]$^{-5+/5+}$ redox couple therefore demonstrates 6$^+$ as an effective redox mediator for promoting AOR electrocatalytically. This system displays surprising longevity of electrocatalytic activity, as electrolysis was performed for nearly 3.5 hours at potentials well under those required to oxidize ammonia in the absence of 6.

The surprising accessibility of the [Ru$_2$]$^{4+/5+}$ redox event for complex 6 prompted us to explore the re-oxidation of 6 with oxygen. Addition of 100 equivalents of NH$_3$ in acetonitrile to 2 results in the immediate formation of 3 followed by slow transformation to 6 over 1.5 hours with pseudo-first order kinetics, as observed by electronic absorption spectra (FIGS. 4D-F) and a color change from purple to amber. After sparging the solution with N$_2$ to clear away excess NH$_3$, a stream of O$_2$ was bubbled through the solution, resulting in fast oxidation of 6 back to the [Ru$_2$]$^{5+}$ oxidation state as observed in the electronic absorption spectra and a color change from brown back to purple. Another 100 equivalents of ammonia were added, and reduction back to 6 was observed. This experiment demonstrates that our diruthenium complexes can perform the fundamental chemistry necessary for a direct ammonia fuel cell.

Efforts then turned to investigating the mechanism of the transformation proposed in Equation 1. Given ammonia's apparent dual role both as a reductant and as a Brønsted base, preliminary experiments sought to probe the latter function by examining the effect of added NH$_4^+$ to the reduction of 2 with NH$_3$. The presence of ~20 equivalents of NH$_4$PF$_6$ (versus 2) slowed the reduction by a factor of six, which suggests a mechanism with at least one deprotonation step prior to the rate-determining step.

Figures 5A, 5B, 5C:
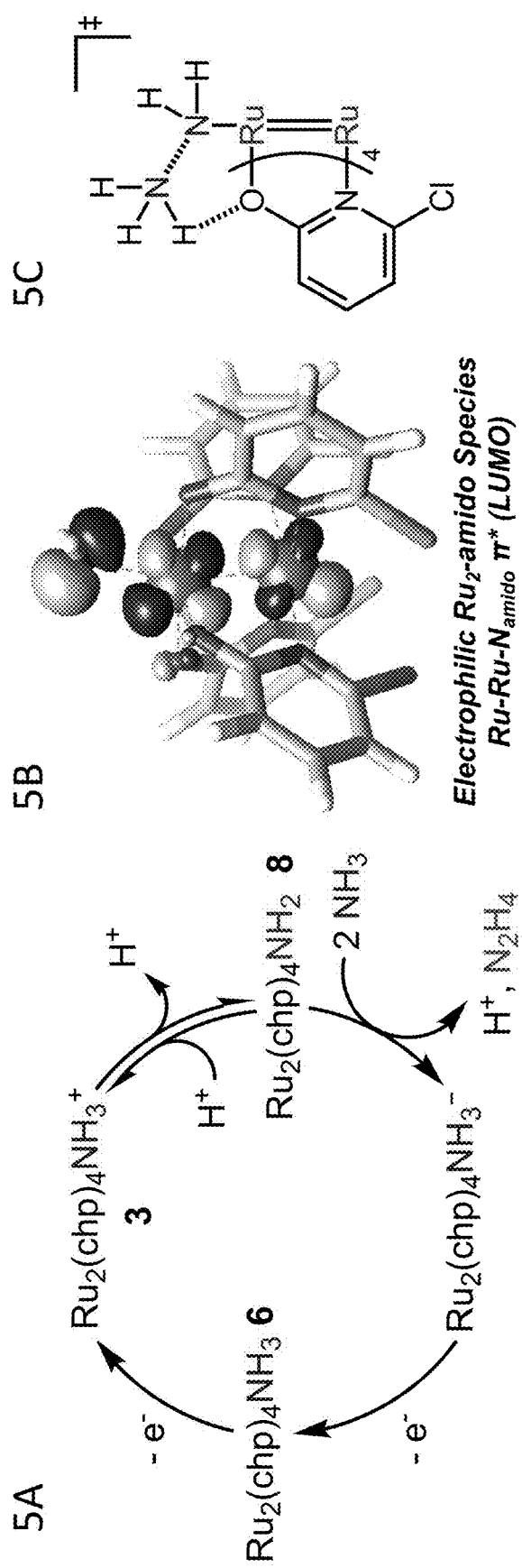
FIG. 5A shows a proposed catalytic cycle for the electrochemical oxidation of ammonia.
FIG. 5B illustrates the results of a DFT orbital calculation showing a 3-center $\pi$ interaction in the proposed Ru—Ru—$NH_2$ species.
FIG. 5C illustrates a potential transition state showing the formation of a N—N bond by reaction of the proposed Ru—Ru—$NH_2$ species with $NH_3$.

Thus, we investigated the intermediacy of a neutral amido complex, $Ru_2(chp)_4NH_2$. Such complex would possess a nitrogen-centered lone pair that could participate in a three-centered π interaction with the diruthenium core. Preliminary electronic structure calculations suggest that this interaction lifts the degeneracy of Ru—Ru π* orbitals and destabilizes the Ru—Ru—$N_{amido}$ π* orbital, which becomes the LUMO of $Ru_2(chp)_4NH_2$. This feature also confers electrophilic character to the amido ligand, thus providing an avenue to N—N bond formation through nucleophilic attack by ammonia at this site (see FIGS. 5A-C).

In sum, these results demonstrate that the disclosed diruthenium complexes can spontaneously catalyze the oxidation of ammonia to nitrogen. Because of the surprising and unexpected ability of the complexes to catalyze this reaction with low overpotential, as compared to other metal complex-based catalysts, the disclosed catalysts and methods have the potential to form the basis of a much-expanded and commercially significant nitrogen economy.

Example 2: Further Considerations for Expanded New Catalyst Development

In this partially prophetic example, we discuss aspects of the chemical structures of the disclosed diruthenium complexes that could be tuned to optimize their ability to catalyze the AOR.

Steric and Electronic Tuning.

The reactivity of $Ru_2(chp)_4(NH_3)$ is significantly distinct from that of mononuclear Ru—ammine complexes, suggesting a potential feature in the metal-metal multiply bonded platform that can be leveraged to facilitate the AOR. Thus, we are investigating a class of $Ru_2$ complexes that display a tunable primary and secondary ligand sphere.

An important feature of the disclosed $Ru_2(ligand)_4$ complexes is that they must be obtainable in their polar "4,0" isomer. In the case of N,O-donor ligands like the chp, this means that one Ru atom is bound by the four O atoms of the equatorial ligands while the other Ru atom is ligated by the four ligand N atoms. Other isomers are possible, and an exploration of synthetic techniques is necessary in order to find out how to specifically obtain only the desired 4,0 isomers of the catalyst precursors. We discuss here the new ligand architectures for which we have already done this exploratory work and have obtained 4,0 complexes.

Figure 6:
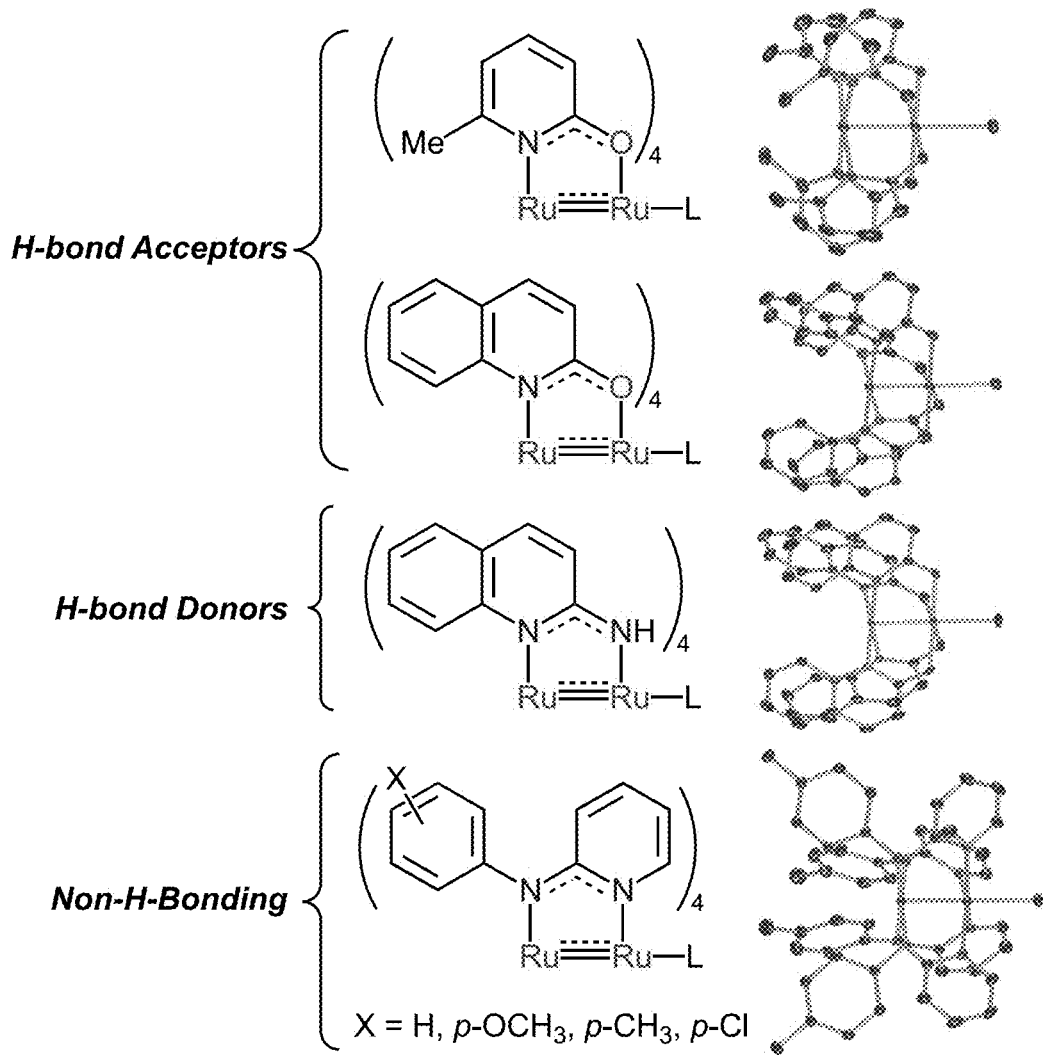
FIG. 6 illustrates new $Ru_2$ complexes with H-bond accepting, donating, and non-H-bonding ligands alongside the crystal structures of their X=Cl analogs.

In our mechanistic work on the $Ru_2(chp)_4(NH_3)$ catalyst, we have recognized that the O atoms of the chp ligands display hydrogen bond accepting character. In order to probe the importance of second coordination sphere hydrogen bonding interactions in the AOR, we have sought to prepare a series of $Ru_2$ catalysts that contain hydrogen bond accepting groups (O atoms), hydrogen bond donating groups (NH groups), or non-hydrogen bonding groups at the periphery of the active site (see FIG. 6). The new oxypyridinate, oxyquinolinate, and aminoquinolinate complexes shown in FIG. 6 have been examined in unpublished work, while we have published several reports detailing the fundamental aspects of $Ru_2$—anilinopyridinate (ap) complexes (Corcos, A. R.; Roy, M. D.; Killian, M. M.; Dillon, S.; Brunold, T. C.; Berry, J. F. Electronic Structure of Anilinopyridinate-Supported $Ru_2^{5+}$ Paddlewheel Compounds. *Inorg. Chem.* 2017, 56, 14662-14670; Corcos, A. R.; Berry, J. F. Anilinopyridinate-supported $Ru_2^{x+}$ (x=5 or 6) paddlewheel complexes with labile axial ligands. *Dalton Trans.* 2017, 46, 5532-5539; Corcos, A. R.; Berry, J. F. Capturing the missing $[AgF_2]^-$ anion within an $Ru_2(III/III)$ dimeric dumbbell complex. *Dalton Trans.* 2016, 45, 2386-2389).

We have found that $NH_3$ reacts with $Ru_2(ap)_4(OTf)$ to form $[Ru_2(ap)_4(NH_3)]OTf$, as inferred by its spectroscopic similarity to the known compound $[Ru_2(ap)_4(NCCH_3)]BF_4$. The facile synthesis of anilinopyridinate ligands using substituted anilines has allowed the preparation of a series of new diruthenium complexes with electronically diverse aryl rings. The ability to tune the electronic properties of this diruthenium system without influencing the steric environment affords a versatile platform for exploring how the redox potentials of the catalysts affect the catalytic AOR reaction.

Steric Prevention of Dimerization.

Figure 7:
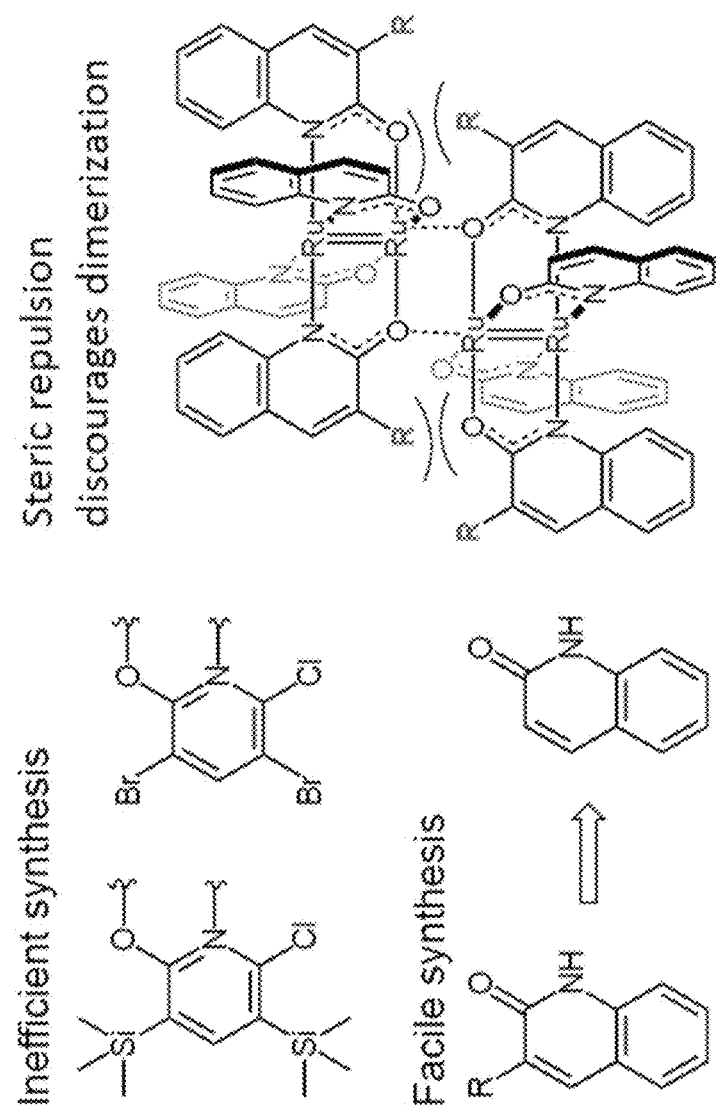
FIG. 7 illustrates sterically demanding ligands designed to discourage dimerization of reduced $Ru_2$ catalysts.

One issue that has impeded our efforts towards isolating potential AOR intermediates is the propensity of $Ru_2(chp)_4$ species to dimerize upon reduction to the $[Ru_2]^{4+}$ oxidation state, as in the formation of $[Ru_2(chp)_4]_2$. We have synthesized new 4,0-$Ru_2$ complexes that sterically prohibit dimerization through bulky substitution at the 3-position of chp, such as those with $Br_2chp$ and $(Me_3Si)_2chp$ (FIG. 7, Brown, T. R.; Lange, J. P.; Mortimer, M. J.; Berry, J. F. New Oxypyridinate Paddlewheel Ligands for Alkane-Soluble, Sterically-Protected $Ru_2(II,III)$ and $Ru_2(II,II)$ Complexes. *Inorg. Chem.* 2018, 57, 10331-10340). The synthesis of these ligands and corresponding $Ru_2$ complexes is difficult and inefficient, since selective substitution at the 3-position of chp is not electronically favorable.

We discovered that commercially available 2-hydroxyquinolinate ($hq^-$) can be used to prepare $Ru_2(hq)_4Cl$ (FIG. 6) with reaction conditions analogous to those used for the synthesis of $Ru_2(chp)_4Cl$. Since substitutions at the 3-position in 2-hydroxyquinoline with methyl, $Me_3Si$, and other groups are reported in the literature (Gonzalez, R.; Ramos, M. T.; De la Cuesta, E.; Avendaño, C. Base-catalyzed Electrophilic Substitution in 2(1H)—Quinolinones. *Heterocycles* 1993, 36, 315-322), we can readily explore the synthesis of $Ru_2$ complexes supported with these substituted ligands and also study their reactivity with ammonia.

Figure 8:
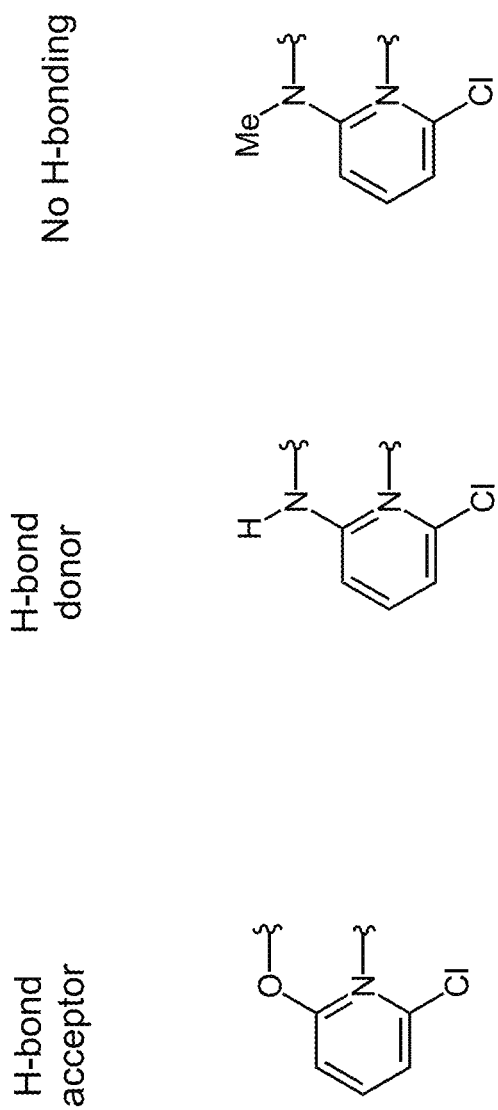
FIG. 8 illustrates modulation of hydrogen bonding near the axial coordination site.

The crystal structure of $Ru_2(chp)_4(N_2H_3Ph)$ features an intramolecular hydrogen bonding interaction that could potentially play an important role in stabilizing intermediates or transition states involved in the AOR. In order to study systematically the effect of hydrogen bonding near the axial coordination site, we can prepare chp and hq analogs that are expected to display distinct hydrogen bonding character. Ligand modifications are shown in FIG. 8 (all three ligands are commercially available, as are their hq analogs). In preliminary work, we have prepared the first examples of diruthenium hq and aminoquinolinate (aq) complexes.

We have also explored the chemistry of anilinopyridinate (ap) complexes, which do not offer any hydrogen bonding donors or acceptors in the second coordination sphere and are more electron-rich than the other ligands just described. The ap ligands are highly tunable based on electron donating/withdrawing properties of the anilines from which they are derived. For all ligand classes, we envision complexes with axial $NH_3$ ligands. It is anticipated that, in some cases, spontaneous reduction to the $[Ru_2]^{4+}$ state will occur, whereas some complexes (i.e., those with more electron rich equatorial ligands) will yield stable $Ru_2^{5+}$—$NH_3$ complexes. Once stable $NH_3$ complexes are accessed, their electrochemical properties will be probed in the absence and presence of excess $NH_3$ to screen for catalytic AOR reactivity.

In sum, these examples illustrate possible structural modifications for tuning the electronic and steric properties of the disclosed diruthenium complexes to optimize their catalytic AOR activity.

The invention is not limited to the embodiments set forth in this disclosure for illustration but includes everything that is within the scope of the appended claims.

We claim:

1. An electrochemical half-cell comprising:
   n anode electrode in contact with a catalyst comprising a diruthenium complex, wherein the catalyst is capable of spontaneously catalyzing the oxidation of $NH_3$ to $N_2$; wherein the diruthenium complex comprises a central metal-metal bonded diruthenium of $[Ru]_2^{n+}$, where n is 3-7; and wherein the diruthenium complex has the chemical structure:

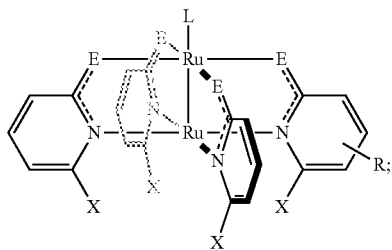

wherein:
L, which may or may not be present, is, if present, a non-competitive ligand;
each E, which may be the same or different, is independently O, S, NH or NY, where Y is an alkyl or an aryl;
each X, which may be the same or different, is a steric tuning group; and
R, which may or may not be present, is (if present) an electronic tuning group.

2. The electrochemical half-cell of claim 1, wherein the anode electrode is further in contact with $NH_3$.

3. The electrochemical half-cell of claim 1, wherein L is $BF_4$, Cl, $OCH_3$ (OMe), tetrahydrofuran (THF), pyridine, trifluoromethanesulfonate (OTf) or $NH_3$.

4. The electrochemical half-cell of claim 3, wherein L is OTf; each E is O; each X is Cl, F, or Me; and R is not present.

5. The electrochemical half-cell of claim 4, wherein each X is Cl.

6. The electrochemical half-cell of claim 4, wherein each X is F.

7. The electrochemical half-cell of claim 4, wherein each X is Me.

8. The electrochemical half-cell of claim 3, wherein L is $NH_3$; each E is O; each X is Cl, F, or Me; and R is not present.

9. The electrochemical half-cell of claim 8, wherein each X is Cl.

10. The electrochemical half-cell of claim 8, wherein each X is F.

11. The electrochemical half-cell of claim 8, wherein each X is Me.

12. An electrochemical cell comprising the electrochemical half-cell of claim 1 that is in fluid, ionic and/or electrical communication with an electrochemical half-cell comprising a cathode electrode.

13. The electrochemical cell of claim 12, wherein the electrochemical cell is an energy storage cell, a fuel cell, or an electrosynthetic cell.

14. The electrochemical cell of claim 12, wherein the electrochemical cell includes a membrane or barrier separating the anode electrode and the cathode electrode.

15. The electrochemical cell of claim 12, wherein the cathode electrode comprises a catalyst capable of catalyzing the reduction of $O_2$ to $H_2O$.

16. The electrochemical cell of claim 15, wherein in operation, $O_2$ is being reduced to $H_2O$ at the cathode electrode.

17. The electrochemical cell of claim 12, wherein in operation, $NH_3$ is being oxidized to $N_2$ at the anode electrode.

18. The electrochemical cell of claim 12, wherein the electrochemical cell is a direct ammonia fuel cell.

* * * * *